(12) United States Patent
Christen et al.

(10) Patent No.: US 11,186,465 B2
(45) Date of Patent: Nov. 30, 2021

(54) ELEVATOR SYSTEM HAVING A RESERVOIR FOR TRACTION MEDIUM

(71) Applicant: Inventio AG, Hergiswil (CH)

(72) Inventors: Lukas Christen, Glattpark/Opfikon (CH); Stefan Weber, Niederwil (CH)

(73) Assignee: INVENTIO AG, Hergiswil (CH)

(*) Notice: Subject to any disclaimer, the term of this patent is extended or adjusted under 35 U.S.C. 154(b) by 670 days.

(21) Appl. No.: 16/065,165

(22) PCT Filed: Dec. 21, 2016

(86) PCT No.: PCT/EP2016/082234
§ 371 (c)(1),
(2) Date: Jun. 22, 2018

(87) PCT Pub. No.: WO2017/108988
PCT Pub. Date: Jun. 29, 2017

(65) Prior Publication Data
US 2019/0023536 A1    Jan. 24, 2019

(30) Foreign Application Priority Data
Dec. 22, 2015 (EP) .................................. 15202059

(51) Int. Cl.
*B66B 11/00* (2006.01)
*B66B 19/00* (2006.01)
(Continued)

(52) U.S. Cl.
CPC ............. *B66B 11/008* (2013.01); *B66B 7/06* (2013.01); *B66B 7/062* (2013.01); *B66B 7/10* (2013.01); *B66B 19/00* (2013.01)

(58) Field of Classification Search
CPC ............ B66B 7/06; B66B 7/10; B66B 11/008; B66B 19/00; B66B 19/02
See application file for complete search history.

(56) References Cited

U.S. PATENT DOCUMENTS

| | | | | |
|---|---|---|---|---|
| 657,380 | A | * | 9/1900 | Baldwin et al. ...... B66B 11/009 187/265 |
| 1,947,708 | A | * | 2/1934 | Frost ........................ B66B 7/10 187/412 |

(Continued)

FOREIGN PATENT DOCUMENTS

| | | |
|---|---|---|
| CN | 1211272 C | 7/2005 |
| CN | 1217846 C | 9/2005 |

(Continued)

*Primary Examiner* — Minh Truong
(74) *Attorney, Agent, or Firm* — William J. Clemens; Shumaker, Loop & Kendrick, LLP

(57) ABSTRACT

An elevator system having: an elevator car vertically movable in an elevator shaft; a traction medium for raising and lowering the elevator car and being guided around at least one roller to the car and being fixed merely at ends thereof; a traction medium reservoir including at least one first deflecting axle and at least one second deflecting axle around which the traction medium is guided in alternation between the first and second axles so that a section, the length depending on the spacing of the first and second axles, of the traction medium is received in the reservoir; and a fixing unit to which the second deflecting axle is fixed, wherein the fixing unit is fastenable at different positions in the elevator shaft so that the spacing between the first and second axles is settable to determine the length of the traction medium received in the reservoir.

18 Claims, 4 Drawing Sheets

(51) Int. Cl.
*B66B 7/06* (2006.01)
*B66B 7/10* (2006.01)

(56) References Cited

U.S. PATENT DOCUMENTS

| | | | | |
|---|---|---|---|---|
| 2,961,216 A | * | 11/1960 | Blair | B66B 7/06 |
| | | | | 254/387 |
| 3,174,585 A | * | 3/1965 | Tofanelli | B66B 11/08 |
| | | | | 187/264 |
| 5,277,276 A | * | 1/1994 | Pramanik | B66B 7/068 |
| | | | | 187/411 |
| 9,561,935 B2 | * | 2/2017 | Perala | B66B 19/00 |
| 2007/0131490 A1 | * | 6/2007 | Siewert | B66B 9/00 |
| | | | | 187/412 |
| 2012/0023863 A1 | | 2/2012 | Van Der Meijden et al. | |
| 2012/0291395 A1 | * | 11/2012 | Plathin | B66B 19/02 |
| | | | | 52/741.1 |
| 2015/0034425 A1 | * | 2/2015 | Ratia | B66B 7/06 |
| | | | | 187/249 |
| 2019/0322491 A1 | * | 10/2019 | Christen | B66B 19/00 |

FOREIGN PATENT DOCUMENTS

| | | |
|---|---|---|
| CN | 101300188 B | 6/2012 |
| CN | 104334490 A | 2/2015 |
| CN | 104955759 A | 9/2015 |
| EP | 2650248 A1 | 10/2013 |
| EP | 2636629 A1 | 11/2013 |
| JP | H06263369 A | 9/1994 |
| WO | 2010100319 A1 | 9/2010 |
| WO | 2014082971 A1 | 6/2014 |
| WO | 2014086639 A1 | 6/2014 |

\* cited by examiner

ELEVATOR SYSTEM HAVING A RESERVOIR FOR TRACTION MEDIUM

FIELD

The present invention relates to an elevator system, to a method for setting a length of a section of a traction medium in a reservoir and to use of a reservoir for storage of a section of the traction medium.

BACKGROUND

Before an elevator system can be operated in its normal mode of operation, it can be installed in a building already during a construction phase. It is then possible for the elevator system to be used during the construction phase for vertical transport of persons and/or material and for it to grow in company with the building during construction thereof. In this way it is possible to dispense with special external elevators (which, for example, can be mounted at the outer side of the building).

For that purpose, for example, a part of the guide rails and an elevator car can be mounted in the elevator shaft, which is provided for the elevator system, when one or more lower stories of the building have been constructed. The elevator car and further components of the elevator system can then be suspended at a lifting platform which can be raised by, for example, a crane or other means to a next-higher level in order to lengthen the transport path of the elevator system.

For example, in the case of a so-called 'climb elevator' system the guide rails of the elevator system can be mounted successively during the construction phase in the elevator shaft and the lifting platform conveyed upwardly at the guide rails as required. The lifting platform can then be fixed at the desired higher position by struts which can be pushed out of the lifting platform into openings in the walls of the elevator shaft.

WO 2014/08669 A1 shows, by way of example, an elevator system which can be temporarily used during construction of a building and in which a usable section of a traction cable of the elevator can be lengthened by opening a cable clamp. The opening and closing of a cable clamp at different positions of the traction cable can shorten the service life of the traction cable.

The document JP H06 263369 A describes an elevator in which the length of the support means can be changed by changing the spacing between rollers which are arranged on the shaft floor and by way of which the support means are guided.

There can be a need, inter alia, to use the same traction medium during the entire construction phase of the building, to use a traction medium several times at different elevators and/or to further use a traction medium, which was used during the construction phase, also during the operational phase.

SUMMARY

Possible features and advantages of forms of embodiment of the invention can be regarded as based on, inter alia and without restricting the invention, the ideas and knowledge described in the following.

One aspect of the invention relates to an elevator system. An elevator system can comprise an elevator car constructed to transport persons and/or material in a vertical direction. The elevator car can be vertically guided on guide rails mounted in an elevator shaft laterally on walls of the elevator shaft. The elevator system can be a so-called 'climb elevator' system (see above).

According to one form of embodiment of the invention the elevator system comprises an elevator car arranged to be vertically movable in an elevator shaft, a traction medium for raising and lowering the elevator car, wherein the traction medium is guided around at least one roller fixed to the elevator car and the traction medium is fixed merely at ends, a reservoir for the traction medium, wherein the reservoir comprises at least one first deflecting axle and at least one second deflecting axle around which the traction medium is guided in alternation between a first deflecting axle and a second deflecting axle so that a section, the length of which depends on the spacing of the at least one first deflecting axle and the at least one second deflecting axle, of the traction medium is received in the reservoir, and a fixing unit at which the at least one second deflecting axle is fixed, wherein the fixing unit is fastenable in different positions in the elevator shaft so that the spacing between the at least one first deflecting axle and the at least one second deflecting axle is settable in order to determine the length of the traction medium received in the reservoir.

A traction medium can in that case be an elongate flexible body suitable for the purpose of transmitting a force along its longitudinal direction. In addition, a traction medium can be deflected over rollers and/or over deflecting axles, i.e. it can lie flexibly around rollers and/or deflecting axles.

A roller can be movable about an axis of rotation so that the traction medium does not have to slide on a (cylindrical and/or round) guide surface of the roller. In general, a deflecting axle can comprise a roller on which the traction medium is deflected. Alternatively, a deflecting axle can also be constructed as a rigid deflecting axle so that the traction medium slides on a (cylindrical and/or round) guide surface of the deflecting axle.

In summary, the elevator system comprises a reservoir for a traction medium which can be lengthened or shortened so as to shorten or lengthen, as required, the section of the traction medium available for the elevator car. For example, after lengthening of the travel height of the elevator car the section of the traction medium can always be shortened so that more traction medium is available to the elevator car.

The reservoir comprises one or more first deflecting axles which, for example, can be mounted at an upper end of the elevator system and one or more second deflecting axles which can be fixed at the bottom in the elevator shaft to a fixing unit. This fixing unit can be adjustable in height so as to be able to set the spacing between the first deflecting axle and the second deflecting axle.

It is possible in this way for the traction medium available to the elevator car to be able to lengthened and shortened without having to be clamped in place between its ends. It is fixed merely at its ends and guided therebetween over rollers and/or deflecting axles. As a result, here is no negative impairment of service life and/or recyclability of a traction medium.

The term "fixed" can in that case be understood in the sense that the traction medium is non-movable with respect to the components to which it is fixed. For example, the traction medium can indeed contact a roller, but is not fixed thereto.

An elevator car can be open at the side. On the other hand, an elevator car can be also bounded at the sides and/or from above by walls.

The fixing unit can be a constructional component to which one or more second deflecting axles are fastened and by which the one or more deflecting axles can be moved in common. Moreover, the fixing unit has a fastening possibility with a setting cable or with the elevator shaft.

The fixing unit is connected with a fixing point by way of at least one setting cable. The setting cable can be a steel cable. The fixing point can be located at, for example, a lower end of the elevator shaft.

The setting cable is lengthenable and/or shortenable between the fixing unit and the fixing point for lengthening and/or shortening the spacing of the at least one first deflecting axle and the at least one second deflecting axle. For example, the setting cable can be fixed to the elevator shaft at the fixing point by a clamp. A section of the setting cable between the fixing unit and the fixing point can be lengthened by releasing the clamp. For example, the elevator car can exert, by its weight and/or a drive of the elevator system, a force on the traction medium so that this draws the fixing unit in the direction of the at least one first deflecting axle.

It is also possible for the fixing unit to be connected by way of two or more setting cables with two or more fixing points so as to increase, for example, redundancy.

According to one form of embodiment of the invention a cable drum for receiving an end section of the setting cable is provided at the fixing point. An unused section of the setting cable can be stowed by this cable drum.

The position of the fixing unit can be continually set by a setting cable. It is possible to prevent vertical movement of the fixing unit at any positions in the elevator shaft.

According to one form of embodiment of the invention the fixing unit is fixable at several positions to a wall of the elevator shaft. The fixing unit can be fixed to the wall at one of these positions for lengthening and/or shortening the spacing of the at least one first deflecting axle and the at least one second deflecting axle. For example, the fixing unit can be screw-connected with the wall at the desired position.

According to one form of embodiment of the invention the reservoir comprises at least two first deflecting axles and/or at least two second deflecting axles. The reservoir can, for example, comprise two, three, four or more first deflecting axles. In addition, the reservoir can comprise two, three, four or more second deflecting axles. It is additionally possible for the reservoir to have one first deflecting axle more than second deflecting axles if, for example, the traction medium is fixed by one end to the fixing unit.

Since the traction medium runs back and forth between the first deflecting axles and the second deflecting axles (or second deflecting axle) in the reservoir the length of the traction medium in the reservoir increases with increasing number of deflecting axles. For example, with each two first and second deflecting axles four times the spacing of these deflecting axles can be stored in the reservoir. Subject to the assumption that the spacing of the first and second deflecting axles initially (at the start of the construction phase) is approximately equal in length to the transport height, four times the length of the traction medium to this transport height is provided in the reservoir. Through shortening of the spacing of the first and second deflecting axles to approximately zero the transport height can thus be increased to approximately four times the original transport height without the traction medium having to be exchanged.

According to one form of embodiment of the invention the at least one first deflecting axle is a deflecting roller and/or the at least one second deflecting axle is a deflecting roller. The traction medium can be guided in the reservoir over the deflecting rollers, i.e. over one or more first deflecting rollers and/or over one or more second deflecting rollers, which are provided in the fixing unit.

However, it can also be case that at least a part of the deflecting axles is non-movable and the traction medium slides on one or more deflecting axles. This can be of advantage so that forces, which act by the elevator car on the traction medium and are introduced into the reservoir, are damped by this deflecting axle and/or, for example, act only in diminished form on the fixing unit.

Moreover, it can be possible for one or more deflecting rollers to be (automatically) fixable or lockable. For example, one or more first deflecting rollers can each have a respective blocking device by which the corresponding deflecting roller can be blocked during movement of the fixing unit. This can be effected by a gearwheel which is immovable in rotational direction of the deflecting roller and which for blocking of the deflecting roller is pushed into an opening, which is formed in correspondence with the gearwheel, in the deflecting roller.

According to one form of embodiment of the invention the reservoir comprises a roller arrangement for reducing a force acting on the traction medium in the reservoir, which roller arrangement is arranged between the section of the traction medium in the reservoir and a section of the traction medium connected with the elevator car. The roller arrangement, which can comprise a plurality of deflecting rollers, can thus be arranged at the inlet of the reservoir. Each of the deflecting rollers of the roller arrangement can reduce a force exerted by the elevator car on the traction medium so that overall a substantially smaller force acts on the fixing unit.

It is also possible for the roller arrangement to comprise a plurality of lockable or fixable deflecting rollers. These lockable deflecting rollers can be locked during normal elevator operation (for example, by a blocking device such as described above) and unlocked for lengthening the traction medium in the reservoir.

According to one form of embodiment of the invention the length of the (first) section of the traction medium received in the reservoir remains unchanged during movement of the elevator car in the elevator shaft. A drive of the elevator system can move only sections of the traction medium which are not contained in the reservoir. In other words, the drive does not act within the reservoir on the traction medium.

According to one form of embodiment of the invention in the case of movement of the elevator car in the elevator shaft a second section of the traction medium guided around a deflecting roller fixed to a counterweight for the elevator shaft is shortened or lengthened and a third section of the traction medium running around the deflecting roller fixed to the elevator car is correspondingly lengthened or shortened. The second section and the third section can be shortened or lengthened by a drive therebetween acting on them.

It is to be understood that the first section of the traction medium is fixed by one end and/or goes over into the third section. Moreover, the second section can be fixed by one end and/or go over into the third section.

According to one form of embodiment of the invention the elevator system further comprises a lifting platform for fastening at different heights above the floor of the elevator shaft so as to lengthen a vertical travel height of the elevator car. For example, the lifting platform can be raised by a crane by one story of the building when this has been increased in height by one story. After raising the lifting platform, the reservoir, i.e. the spacing between the at least one first deflecting axle and the at least one second deflecting axle, can be shortened in such a way that sufficient traction medium is available to the elevator car (i.e. for the above-mentioned second and third sections) for it to be able to be moved also over the entire lengthened travel height.

According to one form of embodiment of the invention the traction medium is fixed by both ends to the lifting platform. For example, one end of the traction medium can be fastened to the lifting platform in the reservoir (i.e. the first section). In addition, one end of the traction medium of the second section (by which the counterweight is moved) can be attached to the lifting platform.

According to one form of embodiment of the invention the at least one first deflecting axle of the reservoir is fixed to the lifting platform. The one or more deflecting axles can thus be raised together with the lifting platform.

According to one form of embodiment of the invention the roller arrangement is, for reducing a force acting on the traction medium in the reservoir, fixed to the lifting platform. The roller arrangement can also be raised together with the lifting platform.

According to one form of embodiment of the invention a drive for the elevator system is fixed to the lifting platform. The drive can also be raised together with the lifting platform.

According to one form of embodiment of the invention the traction medium is a steel cable or comprises a steel cable. A steel cable can in that case have a substantially round cross-section and/or comprise a plurality of steel cables twisted together.

According to one form of embodiment of the invention the traction medium is a belt or comprises a belt, for example a belt consisting of steel wires encased by synthetic material. A belt can have an elongate cross-section with two longer, substantially parallel sides.

A further aspect of the invention relates to a method for setting a length of a section of a traction medium in a reservoir of an elevator system, for example of an elevator system as described above and below. It is to be understood that features of the elevator system can also be features of the method and conversely.

According to one form of embodiment of the invention the method comprises: releasing a fastening of the fixing unit, which is present at a first position in the elevator shaft, so that the fixing unit is movable in the elevator shaft, moving the fixing unit to a second position so that the spacing of the at least one first deflecting axle and the at least one second deflecting axle and thus the length of the section of the traction medium in the reservoir are shortened or lengthened so that a remaining section of the traction medium available for lifting the elevator car is correspondingly lengthened or shortened, and fastening the fixing unit at the second position.

In other words, for lengthening and/or shortening the sections (of the second and third sections as described above) which serve for moving the elevator car and/or the counterweight, the section of the traction medium in the reservoir can be correspondingly shortened and lengthened. This takes place through repositioning the fixing element. If this is moved towards the first deflecting axles, the reservoir frees traction medium, whereas it draws in traction medium in the case of movement of the fixing element away from the first deflecting axles. Due to the fact that the fixing element after repositioning is again fixed relative to the elevator shaft, the desired length is subsequently always available for the sections for moving the elevator car.

It is to be understood that the method can be carried out during and/or after raising the lifting platform. Subsequently, when the fixing element is again fixed to the elevator shaft, normal elevator operation (i.e. transport of persons and/or articles) can be resumed.

A further aspect of the invention relates to use of a reservoir for storing a section of a traction medium of an elevator system, for example of an elevator system as described above and below. It is to be understood that features of the use can also be features of the method and/or of the elevator system and conversely.

According to one form of embodiment of the invention the reservoir comprises at least one first deflecting axle and at least one second deflecting axle about which the traction medium is guided in alternation between a first deflecting axle and a second deflecting axle so that the section of the traction medium received in the reservoir has a length depending on the spacing of the at least one deflecting axle and the at least one second deflecting axle. In addition, the at least one second deflecting axle can be fixed to a fixing unit, the fixing unit being fastenable at different positions in the elevator shaft so that the spacing between the at least one first deflecting axle and the at least one second deflecting axle is settable so as to determine the length of the traction medium received in the reservoir.

It is to be noted that some of the possible features and advantages of the invention are described herein with reference to different forms of embodiment. An expert will recognize that the features can be combined, adapted or exchanged in suitable manner so as to arrive at further forms of embodiment of the invention.

DESCRIPTION OF THE DRAWINGS

Forms of embodiment of the invention are described in the following with reference to the accompanying drawings, in which neither the drawings nor the description is or are to be understood as restricting the invention and in which.

The figures are merely schematic and not true to scale. The same reference numerals denote the same or equivalent features in the different figures.

DETAILED DESCRIPTION

Figure 1:
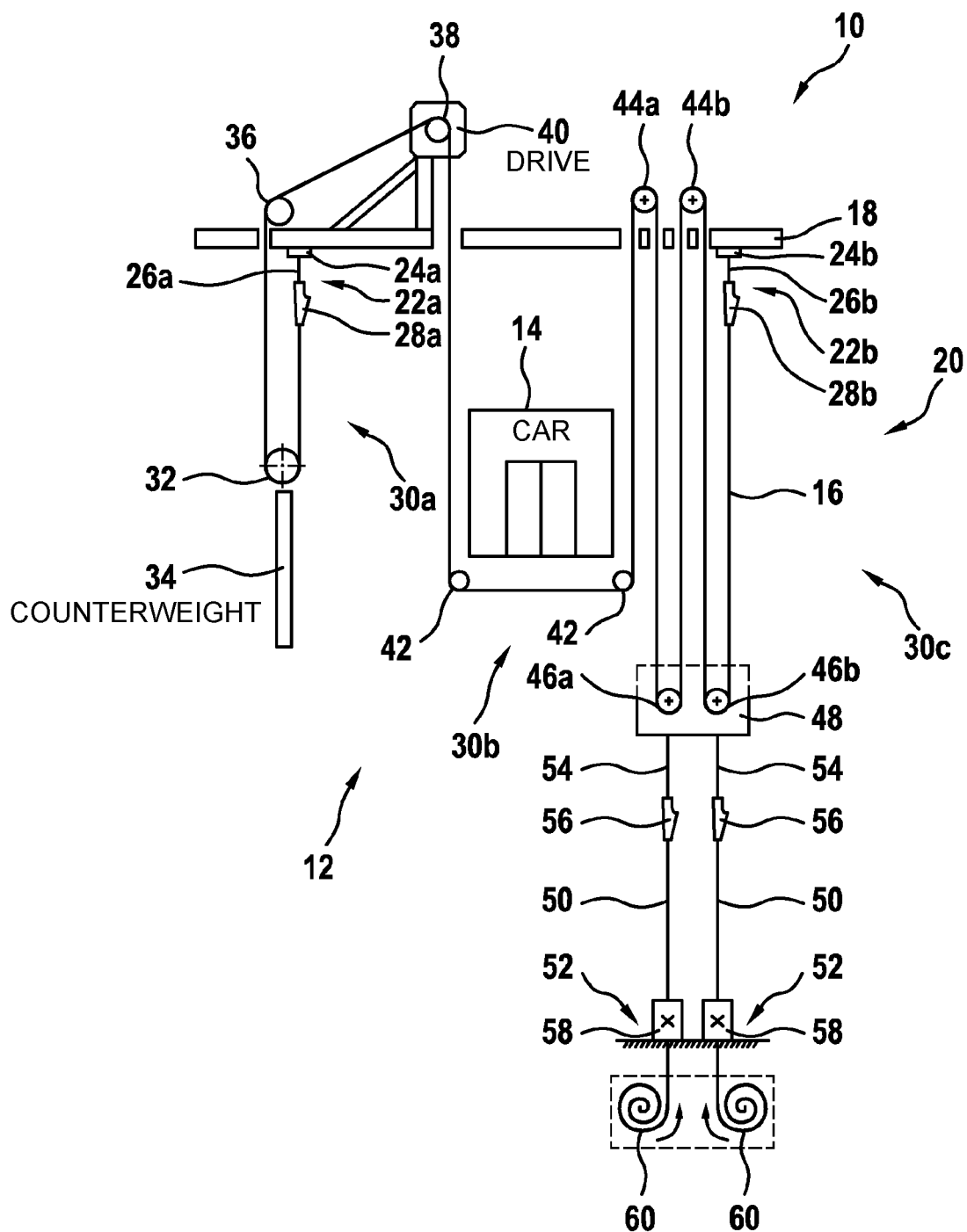
FIG. 1 shows, schematically, an elevator system according to one form of embodiment of the invention.

FIG. 1 shows an elevator system 10 which is arranged in an elevator shaft 12 and comprises an elevator car 14, which is suspended in the elevator shaft to be vertically movable. For example, the elevator car 14 can be guided in the elevator shaft 12 at lateral guide rails.

The elevator car 14 is raised and lowered by a traction medium 16, which can comprise, for example, a traction cable and/or a traction belt.

In addition, the elevator system 10 comprises a lifting platform 18 by which the travel height of the elevator car 14 can be increased during a construction phase of the elevator system 10. For example, a lower section of the guide rails of the elevator system 10 can be installed in the elevator shaft 12 together with the elevator car 14 and then the lifting platform 18 fastened (i.e. fixed) at the upper end of the already finished section of the elevator shaft 12 (such as, for example, the lower two stories of a building). The traction medium 16 can be installed subsequently. The elevator car 14 can then already be used for transport of persons and/or objects in the finished section of the elevator shaft 12.

When a further section of the elevator shaft 12 is finished, the (previously demounted from the elevator shaft) lifting platform 18 can be raised (for example by a crane) to the upper end of the elevator shaft 12 and fixed there again. In this way the elevator car 14 can now again move over the entire finished elevator shaft 12.

Through repeating this process, the elevator system 10 can thus grow together with the growing building.

In order to make more traction medium 16 available to the elevator car 12 after the lifting platform 18 has been raised, the elevator system comprises a reservoir 20 for the traction medium 16, by which the traction medium 16 available to the elevator car can be lengthened when the lifting platform 18 is raised. In that case, the traction medium 16 does not have to be clamped or otherwise fixed between its ends 22a, 22b.

The traction medium 16 is fixed by a first end 22a to the lifting platform 18. For example, a fixing point 24a, which provides a short cable section or belt section 26a to which the end 22a can be fixed by an end connector 28b, is provided at the lifting platform 18.

In the same way, the traction medium 16 is fixed by a second end 22b to the lifting platform 18. Here as well a fixing point 24b, which provides a short cable section or belt section 26b at which the end 22b can be fixed by a further end connector 28b, can be provided at the lifting platform 18.

The traction medium 16 is fixed only by its ends 22a, 22b by end connectors 28a, 28b. It otherwise merely encircles rollers and/or deflecting axles.

Starting from the end 22a, the traction medium 16 runs downwardly in a section 30a and is deflected upwardly again by a roller 32 of a counterweight 34 until it impinges (after encircling one or more further rollers 36) on a roller 38 of a drive 40.

From the drive 40 the traction medium 16 runs downwardly in a further section 30b, where it is deflected by one or more rollers 42 fixed to the elevator car 14 and runs upwardly again until it is again deflected downwardly to a first deflecting axle 44a of the reservoir 20.

As long as the length of the traction medium 16 in the reservoir 20 is not changed, which is usually the case in normal elevator operation, only the sections 30a and 30b change their length during raising and lowering of the elevator car 14. For example, for raising the elevator car 14 the section 30b is shortened by the drive 40 and the section 30a lengthened, so that the counterweight 34 is lowered. This takes place through transport of the traction medium 16 from the section 30b to the section 30a via the roller 38 of the drive 40. Conversely, during lowering of the elevator car 14 the traction medium 16 is transported from the section 30a to the section 30b, whereby the section 30a is shorter and the section 30b longer. The counterweight 34 is raised in this case.

A section 30c, which is guided by a plurality of first deflecting axles 44a, 44b and a plurality of second deflecting axles 46a, 46b, of the traction medium 16 is received in the reservoir 30. The deflecting axles 44a, 44b, 46a, 46b can comprise rollers on which the traction medium 16 can run without (or with only low) friction. All or at least a part of the deflecting axles can also have fixed or immovable guide surfaces on which the traction medium 16 can slide (with higher friction).

The first deflecting axles 44a, 44b—which are arranged more towards the top—of the reservoir 20 are fixed to the lifting platform 18. For example, the deflecting axles 44a, 44b can be installed above the lifting platform 18 and the traction medium 16 guided downwardly through openings in the lifting platform 18.

The second deflecting axles 46a, 46b—arranged more towards the bottom—are fixed to a fixing unit 48.

The traction medium 16 runs in the reservoir 20 or in the section 30c starting from its end 22b, at which it is fixed to the lifting platform 18, in alternation downwardly and upwardly, wherein it is deflected successively on each occasion by a second deflecting axle 46a, 46b and a first deflecting axle 44a, 44b back in the opposite direction. The length of the traction medium 16 in the reservoir 20 or the length of the section 30c is approximately 2N times the spacing of the first deflecting axles 44a, 44b from the second deflecting axles 46a, 46b, wherein N is the number of first deflecting axles 44a, 44b or second deflecting axles 46a, 46b.

In FIG. 1, on each occasion two deflecting axles 44a, 44b or 46a, 46b are shown so that in the reservoir 20 approximately four times the spacing of the deflecting axles 44a, 44b and 46a, 46b can be received. If the elevator system 10 is initially installed with the maximum spacing of the first and second deflecting axles 44a, 44b and 46a, 46b, i.e. the maximum spacing is approximately the initial travel height of the elevator car 14, then the travel height can be increased to approximately four times to five times by emptying the reservoir 20 and without the traction means 16 having to be lengthened.

The fixing unit 48 is connected by way of one, two or more setting cables 50 with one or more fixing points 52 at a lower end of the elevator shaft 12. For example, the fixing unit 48 can provide a respective short cable end 54 to which the respective setting cable 50 can be fixed by means of a clamp 56. The relevant setting cable 50 can be fixed by a further clamp 58 at a fixing point 52.

In normal elevator operation the clamp or clamps 58 is or are closed and the setting cable or cables 50 holds or hold the fixing unit 48 at a specific position in the elevator shaft 12. When the lifting platform 18 is to be raised, the elevator car 14 can be moved, for example, to the lower end of the elevator shaft 12 and deposited there. The one or more clamps 58 can subsequently be released so that the setting cable 50 is movable with respect to the fixing point 52 and can be lengthened.

During raising of the lifting platform 18 the section 30b of the traction medium 16, which runs around the elevator car 14, is in this way lengthened and thus the section 30c in the reservoir 20 shortened, which has the consequence that the fixing unit 48 is drawn upwardly. In this way the reservoir frees traction medium 16.

At the same time, the setting cable or cables 50, which can, for example, be unreeled from a cable drum 60, lengthens or lengthen.

When the lifting platform has been fixed again at the elevator shaft 12, the setting cable or cables 50 can again be fixed at the fixing points 52.

Figure 2:
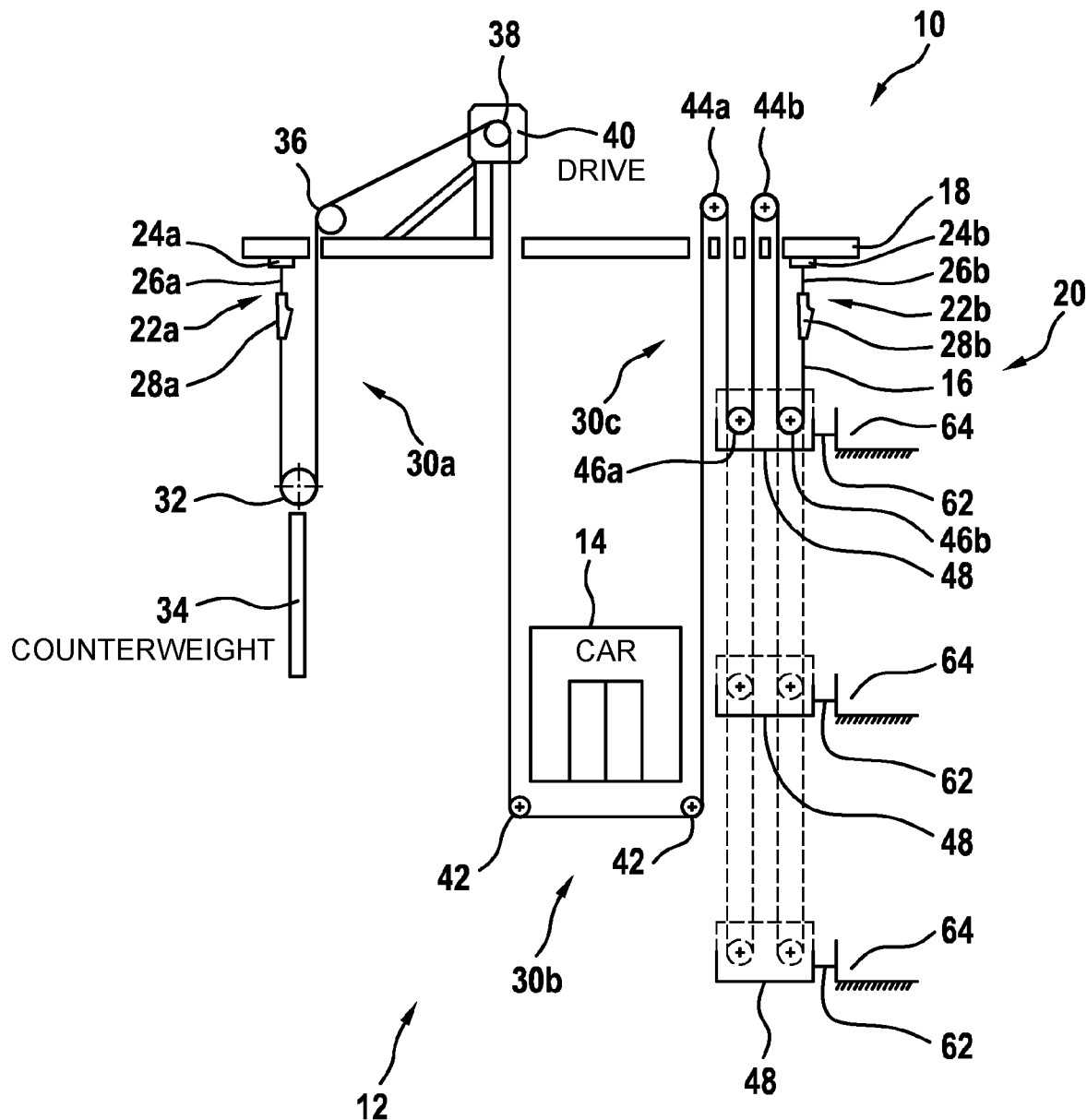
FIG. 2 shows, schematically, an elevator system according to a further form of embodiment of the invention.

FIG. 2 shows a further form of embodiment of an elevator system 10, which is constructed substantially like the elevator system 10 of FIG. 1 up to the fixing of the fixing unit 48 in the elevator shaft 12.

In the case of FIG. 2, the fixing unit 48 is fixed directly in the elevator shaft 12. During normal elevator operation the fixing unit 48 is, for example, directly fastened to a wall 64 of the elevator shaft by, for example, a fastening means 62, such as screws.

Before raising the lifting platform 18, the elevator car 14 can, as already mentioned above, be lowered to the floor of the elevator shaft 12 and/or the fixing unit 48 released from the elevator shaft 12. For example, in this case it can be pulled downwardly only by gravitational force (whereas in the case of FIG. 1 this can take place, for example, additionally by a spring in the cable drum 60).

As described above, through raising the lifting platform 18 the section 30*c* in the reservoir 20 is shortened and the fixing unit 48 pulled upwardly. When the lifting platform 18 is fixed at its new position in the elevator shaft 12, the fixing unit 48 can also be fixed again in the elevator shaft at a new position. In this way, the fixing unit 48 can be displaced upwardly in steps.

Figure 3:
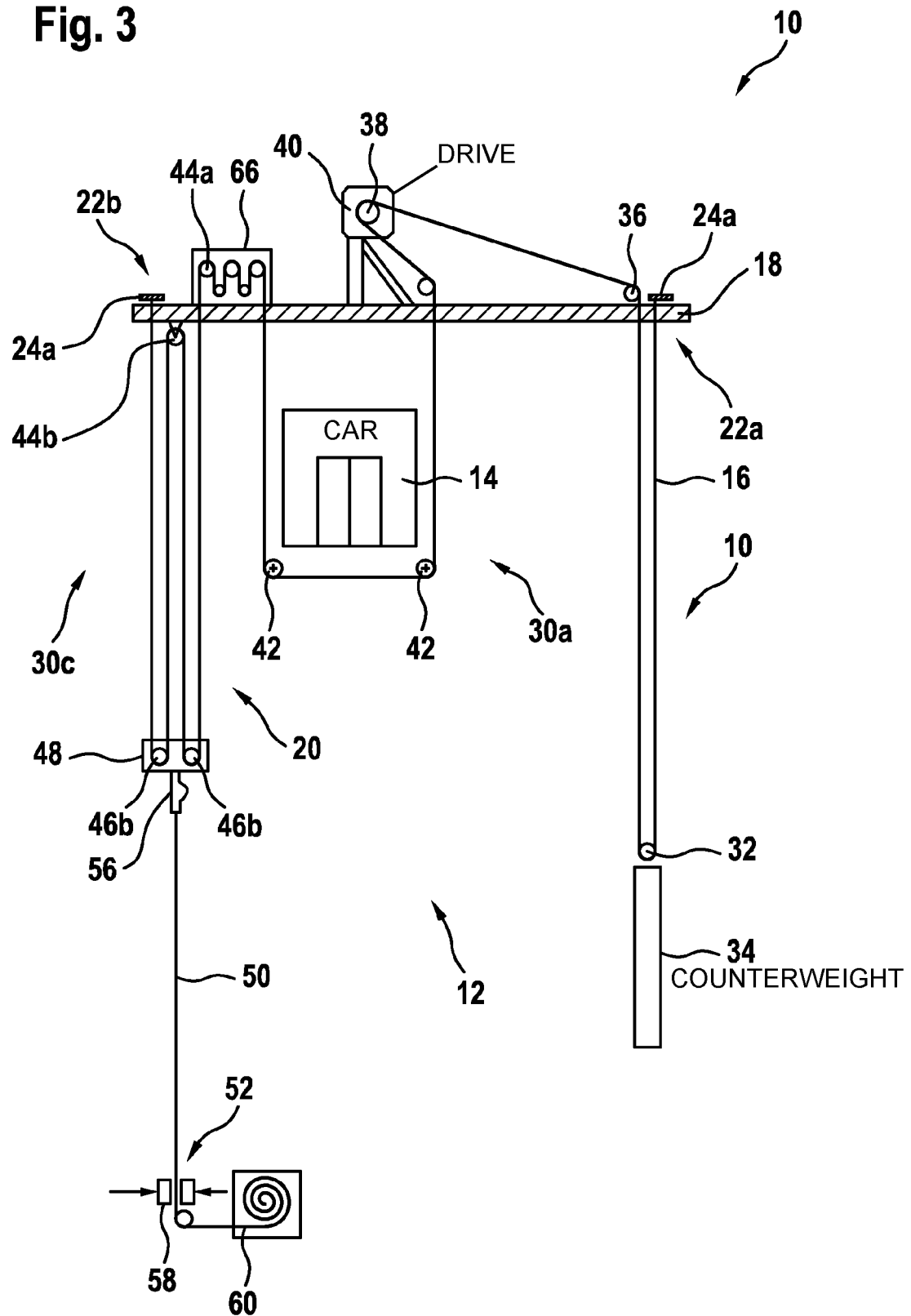
FIG. 3 shows, schematically, an elevator system according to a further form of embodiment of the invention.

FIG. 3 shows an elevator system 10 with a fixing unit 48 analogous to FIG. 1. In FIG. 3, the first deflecting axle 44*a*, at which the traction medium 16 enters the reservoir 20, is replaced by a roller arrangement 66. This roller arrangement 66 can also be used in the elevator system 10 of FIG. 2. In addition, FIG. 3 shows that the one or more further first deflecting axles or deflecting rollers 44*b* can be mounted below the lifting platform 18.

The roller arrangement 66 serves the purpose of minimizing the forces which act on the lifting platform 18.

Figure 4:
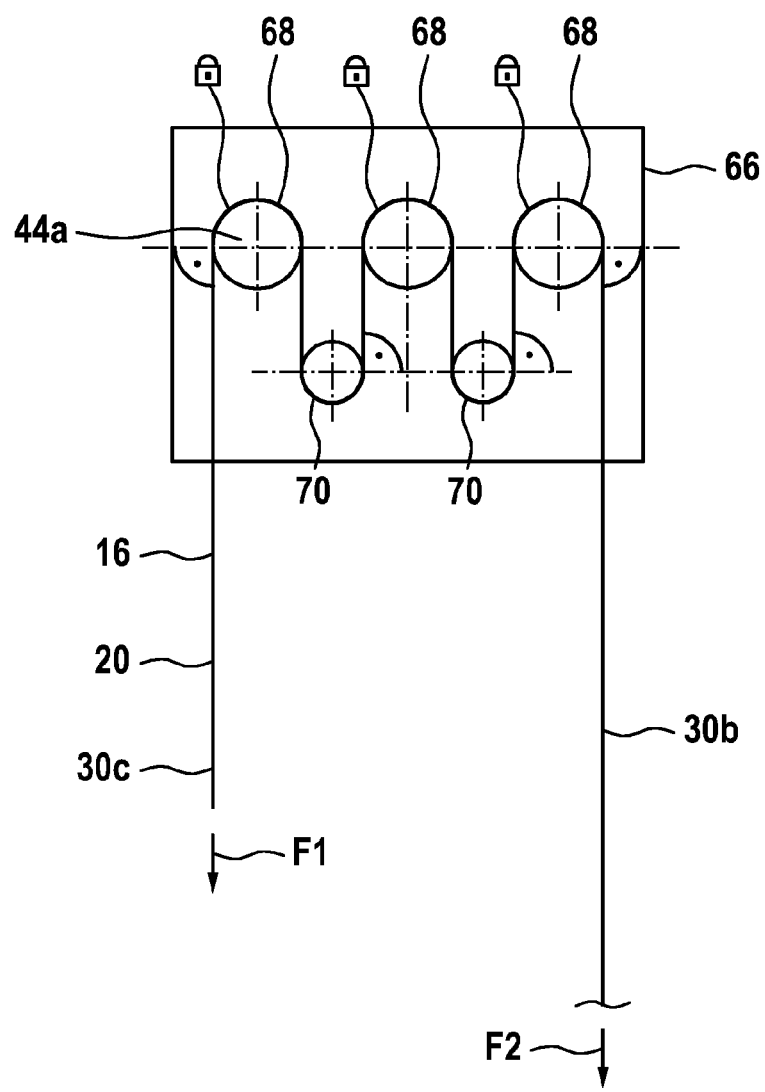
FIG. 4 shows a detail of FIG. 3.

The roller arrangement 66 is illustrated in FIG. 4 to enlarged scale and comprises a plurality of lockable deflecting rollers 68 and further deflecting rollers 70, over which the traction medium is guided in alternation. From the section 30*b* for lifting the elevator car 14 the traction medium 16 is guided around a first deflecting roller 68, then subsequently guided around a further deflecting roller 70, etc., until it leaves the roller arrangement 66 at a last lockable deflecting roller 68 and goes over into the section 40 in the reservoir 20. The last lockable deflecting roller 68 can be understood as a first deflecting axle 44*a* of the reservoir.

During normal elevator operation the lockable deflecting rollers 68 are locked. When the lifting platform 18 is raised, the lockable deflecting rollers 68 are unlocked so that the traction medium 16 present in the reservoir 20 can be shortened. This takes place, as described above, by the fixing unit 48 being displaced in the direction of the lifting platform 18.

When the deflecting rollers 68 are locked, the roller arrangement 66 reduces the force F1 exerted by the traction medium 16 on the section 30*c* in the reservoir 16:

$$F2 \leq F1 e^{\mu\alpha}$$

wherein F2 is the force which is exerted by the section 30*b* with the elevator car 14, μ is the coefficient of adhesive friction of the lockable deflecting rollers 68 and α is the contact angle length. If, for example, the force F2 is 20 kN, μ=0.35 and α=540° (in the case of three deflecting rollers 68 each of 180° contact angle position), the force F1 is lower by the factor 27.

Finally, it is to be noted that terms such as "having", "comprising", etc., do not exclude any other elements or steps and terms such as "one" or "a" do not exclude a plurality. Moreover, it may be noted that features or steps which have been described with reference to one of the above embodiments can also be used in combination with other features or steps of other above-described embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:
   an elevator car vertically movable in an elevator shaft;
   a traction medium for raising and lowering the elevator car, the traction medium being guided around at least one roller fixed to the elevator car and the traction medium being fixed only at ends thereof;
   a reservoir for the traction medium, the reservoir including at least one first deflecting axle and at least one second deflecting axle, the deflecting axles being passive non-driven axles, the traction medium being guided about and in alternation between the at least one first deflecting axle and the at least one second deflecting axle so that a section of the traction medium is received in the reservoir, a length of the section depending on a spacing between the at least one first deflecting axle and the at least one second deflecting axle; and
   a fixing unit to which the at least one second deflecting axle is fixed, the fixing unit being fastenable in the elevator shaft at different vertical positions so that the spacing between the at least one first deflecting axle and the at least one second deflecting axle is settable thereby determining the length of the section of the traction medium received in the reservoir, wherein the fixing unit is connected with a fixing point in the elevator shaft by at least one setting cable and the setting cable is at least one of lengthenable and shortenable between the fixing unit and the fixing point for setting the spacing between the at least one first deflecting axle and the at least one second deflecting axle.

2. The elevator system according to claim 1 wherein the setting cable is fixed at the fixing point by a clamp at the elevator shaft.

3. The elevator system according to claim 1 including a cable drum positioned at the fixing point and receiving an end section of the setting cable.

4. The elevator system according to claim 1 wherein the fixing unit is fixable at several positions at a wall of the elevator shaft and is fixed at different ones of the positions for at least one of lengthening and shortening the spacing between the at least one first deflecting axle and the at least one second deflecting axle.

5. The elevator system according to claim 1 wherein the reservoir includes at least two of the first deflecting axle and at least two of the second deflecting axle.

6. The elevator system according to claim 1 wherein at least one of the at least one first deflecting axle and the at least one second deflecting axle is a deflecting roller.

7. The elevator system according to claim 1 wherein the reservoir includes a roller arrangement for reducing a force acting on the section of the traction medium in the reservoir, the roller arrangement being arranged between the section of the traction medium in the reservoir and a section of the traction medium connected with the elevator car.

8. The elevator system according to claim 1 wherein the reservoir includes a roller arrangement for reducing a force acting on the section of the traction medium in the reservoir, the roller arrangement including a plurality of lockable deflecting rollers for reducing a force acting on the section of the traction medium in the reservoir.

9. The elevator system according to claim 1 wherein the length of the section of the traction medium received in the reservoir remains unchanged when the elevator car moves in the elevator shaft.

10. The elevator system according to claim 1 wherein the section of the traction medium received in the reservoir is a first section, a second section of the traction medium that extends from a drive to a traction medium fixing point and is guided around a deflecting roller fixed to a counterweight for the elevator car is shortened or lengthened when the elevator car moves in the elevator shaft, and a third section of the traction medium extending from the drive to the reservoir and running around the at least one roller fixed to the elevator car is correspondingly lengthened or shortened.

11. The elevator system according to claim 10 wherein the second section and the third section are shortenable or lengthenable by the drive driving the traction medium between the second section and the third section.

12. The elevator system according to claim 1 including a lifting platform for fastening at different heights above a floor of the elevator shaft to lengthen a vertical travel height of the elevator car.

13. The elevator system according to claim 12 wherein the at least one first deflecting axle of the reservoir is fixed to the lifting platform.

14. The elevator system according to claim 13 wherein the traction medium is fixed at the ends to the lifting platform.

15. The elevator system according to claim 12 wherein a roller arrangement for reducing a force acting on the section of the traction medium in the reservoir is fixed to the lifting platform.

16. The elevator system according to claim 13 including a drive for driving the traction medium, the drive being i& fixed to the lifting platform.

17. The elevator system according to claim 1 wherein the traction medium is one of a steel cable and a belt including of steel wires encased by synthetic material.

18. A method for setting the length of the section of the traction medium in the reservoir of the elevator system according to claim 1, the method comprising the steps of:

releasing a fastening of the fixing unit at a first position in the elevator shaft to enable the fixing unit to move in the elevator shaft;

moving the fixing unit to a second position in the elevator shaft by shortening or lengthening the at least one setting cable that connects the fixing unit to the fixing point, wherein the spacing between the at least one first deflecting axle and the at least one second deflecting axle and thus the length of the section of the traction medium in the reservoir are shortened or lengthened whereby a remaining section of the traction medium available for lifting the elevator car is correspondingly lengthened or shortened; and fastening the fixing unit at the second position.

* * * * *